United States Patent [19]
Yamamoto et al.

[11] Patent Number: 6,093,980
[45] Date of Patent: Jul. 25, 2000

[54] KEY APPARATUS FOR VEHICLE, METHOD OF CONTROLLING STARTING OF VEHICLE ENGINE, AND KEY SYSTEM FOR VEHICLE

[75] Inventors: Keiji Yamamoto; Masao Omura, both of Aichi-ken, Japan

[73] Assignee: Toyota Jidosha Kabushiki Kaisha, Japan

[21] Appl. No.: 09/099,433

[22] Filed: Jun. 18, 1998

[30] Foreign Application Priority Data

Jun. 19, 1997 [JP] Japan .................................. 9-163105

[51] Int. Cl.[7] .................................................. B60R 25/00
[52] U.S. Cl. .......................................... 307/10.5; 307/10.3
[58] Field of Search ...................................... 307/9.1, 10.1, 307/10.2, 10.5, 10.3, 10.6; 180/287; 340/425.5, 426, 825.3, 825.32, 825.34, 825.44, 825.54, 825.69, 825.72

[56] References Cited

U.S. PATENT DOCUMENTS

| | | | |
|---|---|---|---|
| 3,987,408 | 10/1976 | Sassover et al. ........................ | 307/10.5 |
| 4,383,242 | 5/1983 | Sassover et al. ........................ | 340/64 |
| 5,808,372 | 9/1998 | Schwegler et al. ..................... | 307/10.3 |
| 5,850,173 | 12/1998 | DiCroce et al. ........................ | 340/426 |

FOREIGN PATENT DOCUMENTS

| | | |
|---|---|---|
| 4-135854 | 12/1992 | Japan . |
| 7-324533 | 12/1995 | Japan . |
| 8-86130 | 4/1996 | Japan . |

*Primary Examiner*—Jeffrey Gaffin
*Assistant Examiner*—Kim Huynh
*Attorney, Agent, or Firm*—Finnegan, Henderson Farabow, Garrett & Dunner, L.L.P.

[57] ABSTRACT

A key for a vehicle is provided with a transmitting circuit and an electric power receiving/signal transmitting circuit. The transmitting circuit transmits a wireless SW signal by radio waves in a case in which an instruction switch is on. The electric power receiving/signal transmitting circuit receives electric power from an electric power transmitting circuit provided in a key cylinder for a vehicle at a vehicle, and transmits a transponder code signal in a case in which the electric power receiving/signal transmitting circuit receives the electric power. When the key for a vehicle is inserted in the key cylinder for a vehicle, a light emitting device provided in the key cylinder for a vehicle emits light. In a case in which a receiver provided at the transmitting circuit receives the light, transmission of the wireless SW signal is prohibited.

18 Claims, 12 Drawing Sheets

KEY APPARATUS FOR VEHICLE, METHOD OF CONTROLLING STARTING OF VEHICLE ENGINE, AND KEY SYSTEM FOR VEHICLE

BACKGROUND OF THE INVENTION

1. Field of the Invention

The present invention relates to a key apparatus for a vehicle, a method of controlling the starting of a vehicle engine, and a key system for a vehicle, and more particularly to a key apparatus for a vehicle, a method of controlling the starting of a vehicle engine, and a key system for a vehicle, which transmit a first signal when instructed by instructing means for instructing transmission of the first signal, and which transmit a second signal when receiving electric power from an electric power transmitting means provided at a vehicle.

2. Description of the Related Art

Conventionally, there has been suggested a keyless entry system comprising an ignition key and a door locking and unlocking apparatus. The ignition key transmits a key code stored in advance in a memory when an operating switch provided in a body surface of a grip is operated. The door locking and unlocking apparatus receives a key code transmitted from the ignition key. In a case in which the received key code coincides with the key code stored in advance, the apparatus judges that the key code is transmitted from an appropriate ignition key, and locks and unlocks the door.

Further, there has been suggested an immobilizer (a transponder) which is structured so as to electromagnetically connect an antenna coil in the ignition key and an antenna coil in a vehicle (the key cylinder) to each other in the case in which it is detected that the ignition key is inserted into the key cylinder. By supplying electric power to the ignition key, a key code is transmitted from the ignition key, and the key code is received by the vehicle. When the key code is received by the vehicle and the received key code coincides with a key code stored in advance, it is judged that the key code has been transmitted from an appropriate ignition key, and starting of the engine is permitted.

Since operation becomes complex when the keyless entry system function and the immobilizer function are independently provided in the ignition key, there has been suggested a key unit commonly having these respective functions (Japanese Patent Application Laid-Open (JP-A) No. 7-324533).

However, in the case in which this transponder for the immobilizer is incorporated within the ignition key for the keyless entry system, when the key blade is inserted into the key cylinder or the ignition key is rotated, there is the concern that a switch disposed on the body surface of the grip may be erroneously operated and the key code for the keyless entry system may be transmitted by radio waves such that communication of the transponder is prevented.

SUMMARY OF THE INVENTION

The present invention has been achieved by taking the aforementioned into consideration, and an object of the present invention is to provide a key apparatus for a vehicle, a method of controlling starting of a vehicle engine, and a key system for a vehicle, which can accurately communicate a second signal.

In order to achieve the aforementioned object, a first aspect of a first invention is a key apparatus for a vehicle comprising: transmitting means provided with an instructing means for instructing transmission of a first signal, and transmitting the first signal by radio waves in accordance with the instruction by the instructing means; electric power receiving/signal transmitting means for receiving electric power from an electric power transmitting means provided in a vehicle, and transmitting a second signal in a case in which the electric power receiving/signal transmitting means receives the electric power; and prohibiting means for prohibiting transmission of the first signal in a case in which the second signal is transmitted.

A second aspect of the first invention is structured such that in the first aspect, the prohibiting means comprises: receiving means for receiving a third signal transmitted from the vehicle and expressing prohibition of transmission of the first signal, and signal transmission prohibiting means for prohibiting transmission of the first signal while the third signal is being received by the receiving means.

A third aspect of the first invention is structured such that in the second aspect, the third signal is provided by light communication.

A fourth aspect of the first invention is structured such that in the second aspect or the third aspect, the first signal is a signal expressing a number, and after the third signal is transmitted from the vehicle, a fourth signal for instructing a change of the number to be transmitted as the first signal is further transmitted, and the receiving means is structured so as to be able to receive the fourth signal, and the key apparatus further comprises changing means for changing the number by a predetermined amount in a case in which the fourth signal is received by the receiving means.

A fifth aspect of the first invention is structured such that in any one of the second aspect to the fourth aspect, after the third signal has been transmitted from the vehicle, in a case in which the second signal is not received, a fifth signal instructing transmission of a specific signal is transmitted, and the receiving means is structured so as to be able to receive the fifth signal, and the electric power receiving/signal transmitting means is structured so as to be able to transmit the specific signal, and in a case in which the fifth signal is received by the receiving means, the electric power receiving/signal transmitting means further transmits the specific signal.

A sixth aspect of the first invention is structured such that in the fifth aspect, the specific signal is the first signal.

A seventh aspect of the first invention is structured such that in any one of the second aspect to the sixth aspect, the vehicle stores at least one predetermined geographical region having a bad environment for radio waves, detects a position of the vehicle, and judges whether the detected position of the vehicle is a position in a stored geographical region, and in a case in which the position of the vehicle is judged to be a position in a stored geographical region, the vehicle further transmits a sixth signal instructing a change of a frequency for transmitting the first signal, and the receiving means is structured so as to be able to receive the sixth signal, and the key apparatus further comprises frequency changing means for changing the frequency in a case in which the sixth signal is received by the receiving means.

An eighth aspect of the first invention is structured such that in the first aspect, the first signal is an instructing signal expressing a control instruction for door locking of the vehicle, and the second signal is an identification signal used for permitting starting of a vehicle engine.

A method of controlling starting of a vehicle engine in accordance with a second invention is a method of controlling starting of a vehicle engine by communication between the key apparatus for a vehicle according to the eighth aspect and a vehicle which is equipped with an electric power transmitting means for transmitting electric power to the key apparatus for a vehicle and for receiving the second signal, receiving means for receiving the first signal, door lock means for controlling door locking and door unlocking on the basis of a signal from the receiving means, a key cylinder in and from which the key apparatus for a vehicle can be inserted and withdrawn, and vehicle engine control means for controlling the vehicle engine, the method comprising the steps of: operating the electric power transmitting means of the vehicle in a case in which the key apparatus for a vehicle is inserted in the key cylinder; the key apparatus for a vehicle transmitting the second signal in a case in which electric power is received from the electric power transmitting means; and the vehicle engine control means controlling starting of the vehicle engine at the vehicle on the basis of the second signal received by the electric power transmitting means.

A third invention is a key system for a vehicle comprising: a key apparatus for a vehicle according to the eighth aspect; and provided in a vehicle, electric power transmitting means for transmitting electric power to the key apparatus for a vehicle and for receiving the second signal, receiving means for receiving the first signal, door lock means for controlling door locking and door unlocking on the basis of a signal from the receiving means, a key cylinder in and from which the key apparatus for a vehicle can be inserted and withdrawn, and vehicle engine control means for controlling the vehicle engine; wherein the key system further comprises operating means for operating the electric power transmitting means of the vehicle in a case in which the key apparatus for a vehicle is inserted in the key cylinder, and the vehicle engine control means controls starting of the vehicle engine on the basis of the second signal.

The transmitting means in accordance with a first aspect is provided with instructing means for instructing transmission of the first signal, and transmits the first signal by means of radio waves in accordance with the instruction by the instructing means.

The electric power receiving/signal transmitting means receives electric power from the electric power transmitting means provided in the vehicle, and transmits a second signal when the electric power receiving/signal transmitting means receives electric power.

In this case, the electric power receiving/signal transmitting means and the electric power transmitting means are provided with coils. The electric power receiving/signal transmitting means receives electric power from the electric power transmitting means due to a magnetic connection of the coils of the electric power receiving/signal transmitting means and the electric power transmitting means. The electric power receiving/signal transmitting means transmits a second signal when it receives electric power. At the vehicle, it is sensed whether the main body of the key apparatus for a vehicle is set at a predetermined position, and electric power is supplied from the electric power transmitting means in the case when it is sensed that the main body is set at the predetermined position.

In this way, when it is sensed that the main body of the key apparatus for a vehicle is set at a predetermined position of the vehicle, and the electric power is supplied from the electric power transmitting means, the electric power receiving/signal transmitting means transmits the second signal. At this time, when the first signal is transmitted by means of radio waves in accordance with the instruction from the instructing means, transmission of the second signal is obstructed by the transmitted first signal.

The prohibiting means in accordance with the present invention prohibits transmission of the first signal in the case in which the second signal is transmitted.

In this way, since transmission of the first signal is prohibited in the case in which the second signal is transmitted, the obstruction of the transmission of the second signal by the first signal can be prevented, and the second signal can be accurately communicated.

In this case, the prohibiting means may be formed by receiving means for receiving a third signal transmitted from the vehicle and expressing prohibition of transmission of the first signal, and signal transmission prohibiting means for prohibiting the transmission of the first signal while the third signal is being received by the receiving means.

Here, the fact that the main body of the key apparatus for a vehicle is set at a predetermined position of the vehicle is detected at the vehicle, and electric power from the electric power transmitting means is supplied, whereby the second signal is transmitted. Therefore, the third signal may be a signal transmitted from the vehicle while the vehicle detects the second signal after it has been detected at the vehicle that the main body of the key apparatus for a vehicle is set at the predetermined position of the vehicle. Namely, the detecting means, which detects that the main body of the key apparatus for a vehicle is set at the predetermined position of the vehicle, is provided at the vehicle.

In this way, if transmission of the first signal is prohibited during the time that the third signal transmitted from the vehicle is being received, it suffices to not provide a detecting means at the key apparatus for a vehicle. Therefore, the key apparatus for a vehicle can be made compact.

The third signal may be provided by light communication. Namely, while the vehicle receives the second signal after it has been detected at the vehicle that the main body of the key apparatus for a vehicle is set at the predetermined position of the vehicle, light may be emitted from the vehicle (continuous emission of light or flashing of light at a predetermined period).

As mentioned above, when the third signal is provided by light communication, the obstruction of the transmission of the second signal due to the third signal can be prevented, so that the second signal can be accurately communicated.

It has been conventionally suggested that the first signal be a signal expressing a number. This has been suggested for the purpose of preventing signals expressing the same number from being repeatedly transmitted and received when the number is changed by a predetermined amount (for example, incremented (or decremented)) at the key apparatus for a vehicle and at the vehicle in accordance with the transmission and reception of the first signal. At the vehicle side, in the case in which the number expressed by the first signal received from the key apparatus for a vehicle and the number changed by a predetermined amount at the vehicle coincide with each other, for example, the door is locked and unlocked.

In this case, when such changing of the numbers is separately and independently performed at the key apparatus side for the vehicle and at the vehicle in accordance with the transmission and reception of the first signal, in the case that the first signal is erroneously transmitted from the key apparatus for a vehicle but the vehicle does not receive the first signal, the number expressed by the first signal in the key apparatus for a vehicle (which has been changed by the predetermined amount) and the number expressed by the first signal at the vehicle (which has not been changed by the predetermined amount) do not coincide with each other. Accordingly, the door cannot be locked and unlocked.

In order for the above-described change of number to not be separately and independently performed in the key apparatus for a vehicle and in the vehicle, a fourth signal for instructing a change of a number to be transmitted as the first signal is further transmitted after the third signal has been transmitted from the vehicle. In this case, the receiving means is structured so as to be able to receive the fourth signal. Then, the changing means changes the number by a predetermined amount in the case that the fourth signal is received by the receiving means. In this case, at the vehicle, the number is changed by a predetermined amount in accordance with the transmission of the fourth signal.

In this way, in the case in which the fourth signal for instructing the change of the number to be transmitted as the first signal is received, when the number is changed by a predetermined amount, the change of the number by the predetermined amount can be synchronized in the key apparatus for a vehicle and in the vehicle.

Accordingly, even in a case in which the first signal is erroneously transmitted from the key apparatus for a vehicle and the vehicle does not receive the first signal, the numbers expressed by the first signal, which is transmitted and received between the key apparatus for a vehicle and the vehicle, can be made the same.

When the second signal is received from the key apparatus for a vehicle, the vehicle judges whether the key apparatus for a vehicle is appropriate by judging whether the received second signal is an appropriate signal.

Here, in the case in which there is the trouble at the electric power receiving/signal transmitting means that the second signal cannot be transmitted appropriately, the vehicle judges that the key apparatus for a vehicle is not appropriate even if the key apparatus for a vehicle is appropriate.

A fifth signal for instructing transmission of a specific signal is transmitted in the case in which the second signal is not received after the third signal has been transmitted from the vehicle. The receiving means is structured so as to be able to receive the fifth signal, and transmits the specific signal in the case that the fifth signal is received by the receiving means.

In this way, the specific signal is transmitted in the case of receipt of the fifth signal which is transmitted from the vehicle and instructs transmission of the specific signal. Therefore, the specific signal is transmitted even when there is the trouble at the electric power receiving/signal transmitting means that the second signal cannot be appropriately transmitted. Accordingly, when the key apparatus for a vehicle is appropriate, the vehicle receives an appropriate specific signal, and the vehicle judges that the key apparatus for a vehicle is appropriate. Therefore, a backup measure is provided.

The specific signal may be the first signal. When the specific signal is the first signal, the number of the types of signals to be transmitted and the like can be reduced.

The first signal is transmitted by radio waves. However, there are geographical regions in which there is much noise near the frequency for transmitting the first signal. Accordingly, when the vehicle is positioned in such a geographical region, the first signal cannot be accurately communicated.

Predetermined geographical regions having bad environments for radio waves are stored in the vehicle. The position of the vehicle is detected, and it is judged whether the detected position of the vehicle is a position within a stored geographical region. When it is judged that the vehicle is positioned within such a geographical region, a sixth signal instructing changing of the frequency for transmitting the first signal is further transmitted. The receiving means is structured so as to be able to receive the sixth signal. The frequency changing means changes the frequency in a case in which the sixth signal is received by the receiving means.

As mentioned above, since the frequency for transmitting the first signal is changed in the case that the vehicle is positioned in a predetermined geographical region having a bad environment for radio waves, the influence of the noise can be reduced.

There are cases of instructing door locking of the vehicle by using the key apparatus for a vehicle, and identifying permission to start of the vehicle engine. Here, as described in the eighth aspect, the instructing signal for expressing a control instruction for door locking of the vehicle is used as the first signal, and the identification signal used for permitting starting of the vehicle engine is used as the second signal. In accordance with this structure, even if the instruction for door locking of the vehicle is given at a time of identification for permitting starting of the vehicle engine, the identification for permitting starting of the vehicle engine is given priority, so that the signal of instructing door locking of the vehicle does not prevent the identification of permission to start the vehicle engine.

At a time of starting the vehicle engine, the key apparatus for a vehicle must be inserted at the vehicle. As in the second invention, the instructing signal expressing the control instruction for door locking of the vehicle is used as the first signal, and the identification signal used for permitting starting of the vehicle engine is used as the second signal. In accordance with this structure, even if the instruction for door locking of the vehicle is given at a time of identification for permitting starting of the vehicle engine, the identification for permitting starting of the vehicle engine is given priority, so that the signal of instructing door locking of the vehicle does not prevent the identification of permission to start the vehicle engine.

A key system for a vehicle in accordance with the third invention is structured so as to comprise: the key apparatus for a vehicle according to the eighth aspect; and provided in a vehicle, electric power transmitting means for transmitting electric power to the key apparatus for a vehicle and for receiving the second signal, receiving means for receiving the first signal, door lock means for controlling door locking and door unlocking on the basis of a signal from the receiving means, a key cylinder in and from which the key apparatus for a vehicle can be inserted and withdrawn, and a vehicle engine control means for controlling the vehicle engine; wherein the key system further comprises operating means for operating the electric power transmitting means of the vehicle in a case in which the key apparatus for a vehicle is inserted in the key cylinder, and the vehicle engine control means controls starting of the vehicle engine on the basis of the second signal. In accordance with this structure, the communication of the signal between the vehicle and the key apparatus for a vehicle can be reliably performed, and identification for permitting starting of the vehicle engine can be reliably performed.

DESCRIPTION OF THE PREFERRED EMBODIMENTS

A first embodiment in accordance with the present invention will be described in detail hereinafter with reference to the drawings.

Figure 1A:
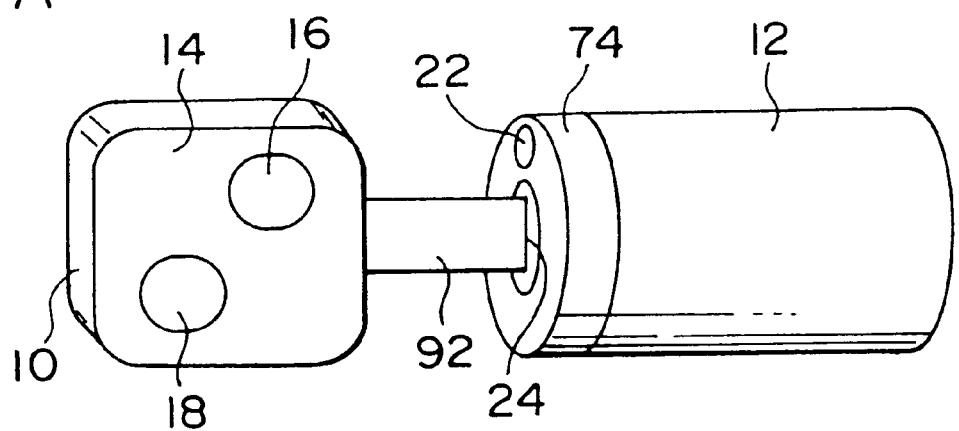
FIGS. 1A and 1B are views which show an ignition key and a key cylinder.

In FIG. 1A, an ignition key 10 and a key cylinder 12 in which the ignition key 10 is inserted are shown. A first switch 16 for keyless entry and a second switch 18 for opening a trunk compartment, a glove compartment, or the like are provided on a body surface of a grip 14 of the ignition key 10. In this case, the first switch 16 and the second switch 18 correspond to the instructing means of the present invention.

Figure 1B:
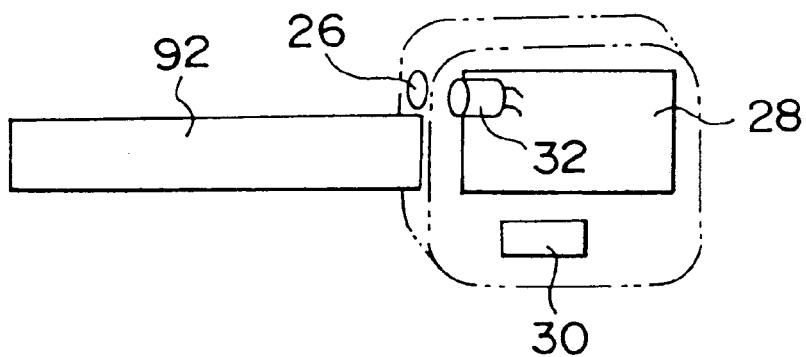

Further, a transmitting circuit 28 and a transponder 30, which make the ignition key 10 serve as a key apparatus for a vehicle, are disposed within the grip 14 of the ignition key 10, as shown in FIG. 1B. A photodiode 32 serving as receiving means is connected to the transmitting circuit 28.

The key cylinder is provided with an antenna coil 74, a key insertion opening 24, and an LED 22. The antenna coil 74 is disposed in the vehicle and is provided for communication with the transponder. The key 10 is inserted into the key insertion opening 24. The LED 22 is provided at the end portion of the key cylinder 12 at which the key insertion opening 24 is provided. In this case, the antenna coil 74 corresponds to the electric power transmitting means.

A transparent window 26, for guiding light emitted from the LED 22 to the photodiode 32, is provided at a position corresponding to the LED 22 on the side surface of the grip 14 of the ignition key 10 in the case that the ignition key 10 is inserted into the key insertion opening 24.

Figure 2:
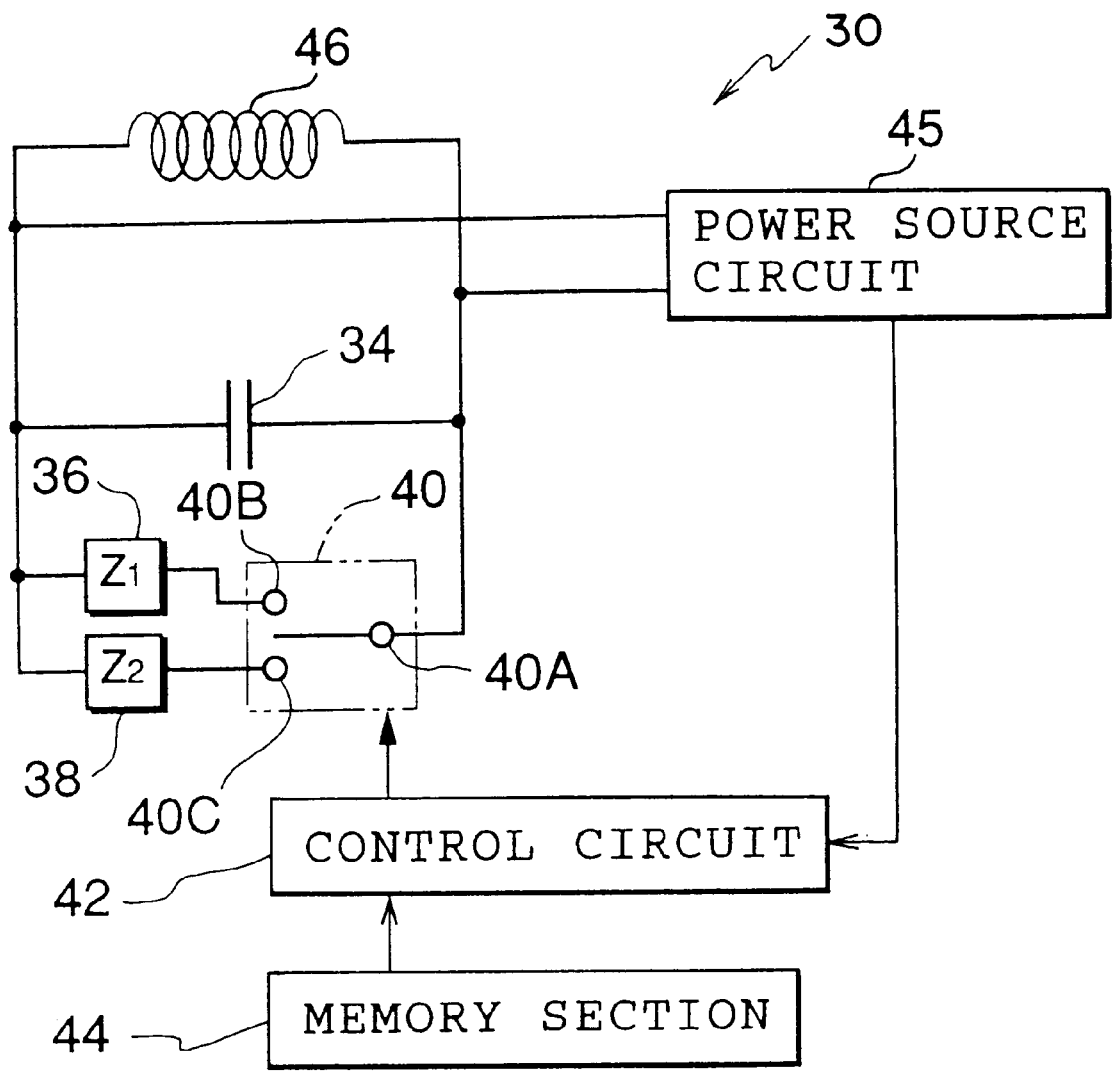
FIG. 2 is a circuit diagram of an electric circuit of a transponder provided in a key apparatus for a vehicle in accordance with a first embodiment.

As shown in FIG. 2, the transponder 30 is provided with an antenna coil 46 serving as electric power receiving/signal transmitting means, a power source circuit 45, a capacitor 34, a first load having an impedance $Z_1$, a second load 38 having an impedance $Z_2$, a switch 40, a control circuit 42 and a memory section 44.

The capacitor 34 is connected to the antenna coil 46 in parallel. One end of the first load 36 and one end of the second load 38 are connected to an end of the antenna coil 46. The other end of the first load 36 is connected to a first terminal 40B of the switch 40, and the other end of the second load 38 is connected to a second terminal 40C of the switch 40. A common terminal 40A of the switch 40 is connected to the other end of the antenna coil 46. In the switch 40, the contact point is switched in such a manner that the common terminal 40A is connected with either the first terminal 40B or the second terminal 40C. The impedance $Z_1$ of the first load 36 is adjusted such that a resonance frequency of the transponder, which includes the LC circuit comprising the antenna coil 46 and the capacitor 34, at a time when the common terminal 40A of the switch 40 is connected with the first terminal 40B and the first load 36 is connected to the antenna coils 22 and 46 and the capacitor 34 in parallel, coincides with a frequency of an alternating current voltage induced in the antenna coil 46. Further, the impedance $Z_2$ of the second load 38 is adjusted such that a resonance frequency of the transponder including the aforementioned LC circuit at a time when the common terminal 40A of the switch 40 is connected with the second terminal 40C and the second load 38 is connected to the antenna coil 46 and the capacitor 34 in parallel, becomes a frequency which is a predetermined value or sufficiently different from the frequency of the alternating current voltage induced in the antenna coil 46.

The memory section 44 is formed by a nonvolatile memory such as a ROM, EEPROM or the like, and stores in advance a transponder code which is particular to the vehicle for which it is to be used. The memory section 44 is connected to the control circuit 42. When a predetermined voltage is applied (electric power is supplied) from the power source circuit 45, the control circuit 42 is operated and transmits a transponder code to the vehicle through the antenna coil 46 by switching the contact point of the switch 40 in such a manner that the amplitude of the alternating current voltage induced in the antenna coil 46 is modulated in accordance with the transponder code stored in the memory section 44.

Figure 3:
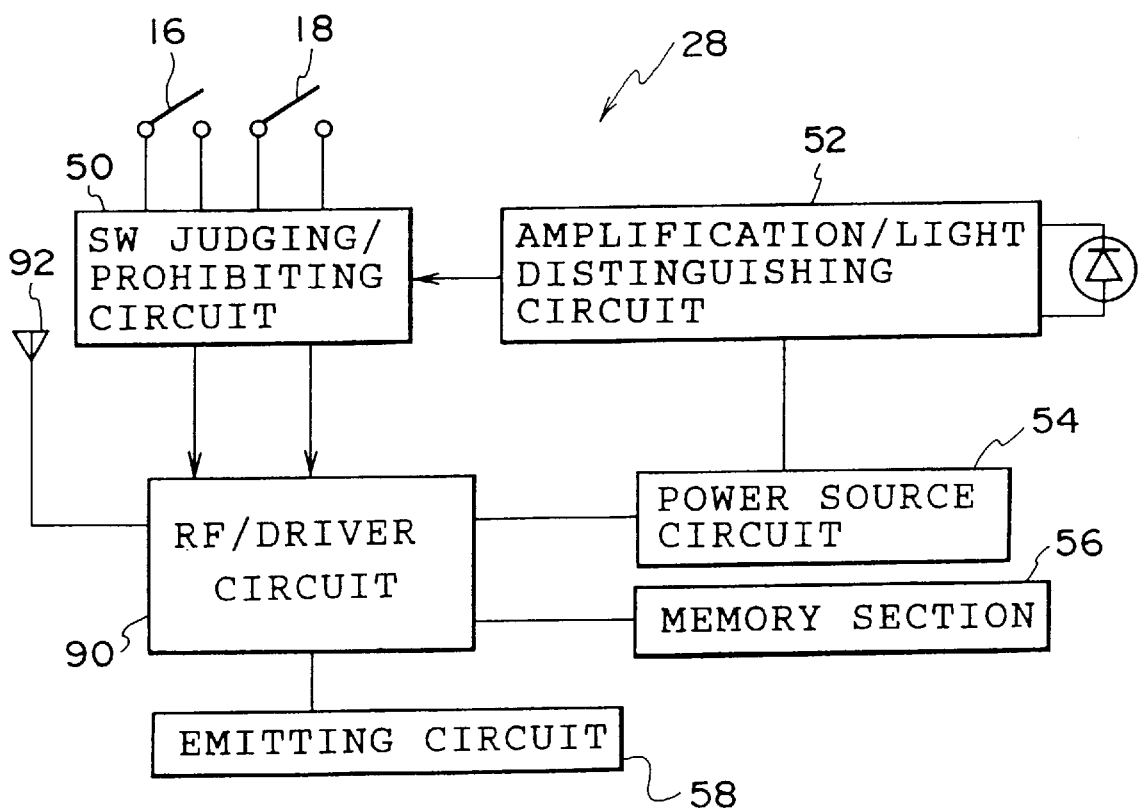
FIG. 3 is a circuit diagram of a transmitting circuit provided in the key apparatus for a vehicle in accordance with the first embodiment.

As shown in FIG. 3, the transmitting circuit 28 is connected to the aforementioned first switch 16 and second switch 18, and is provided with an SW judging/prohibiting circuit 50 for judging whether either of the switches 16 and 18 is operated and prohibiting output of an operating signal due to an operation of the switches 16 and 18 by the control which will be described later. In this case, the SW judging/prohibiting circuit 50 corresponds to the prohibiting means (signal transmission prohibiting circuit) of the present invention.

An amplification/light distinguishing circuit 52, which is connected to the aforementioned photodiode 32, is connected to the SW judging/prohibiting circuit 50. A power source circuit 54 is connected to the amplification/light distinguishing circuit 52. An RF/driver circuit 90 (transmitting means) is connected to the power source circuit 54 and the SW judging/prohibiting circuit 50. In the case in which an operating signal output from the SW judging/prohibiting circuit 50 is inputted, the RF/driver circuit 90 transmits a wireless SW signal by modulating, in accordance with a wireless code stored in a memory section 56 (for wireless door lock and unlock or for opening the trunk compartment, the glove compartment, or the like), a high frequency signal emitted from an emitting circuit 58, and converting the modulated high frequency signal into a radio frequency (RF), and outputting the RF signal to a key plate 92.

Figure 4:
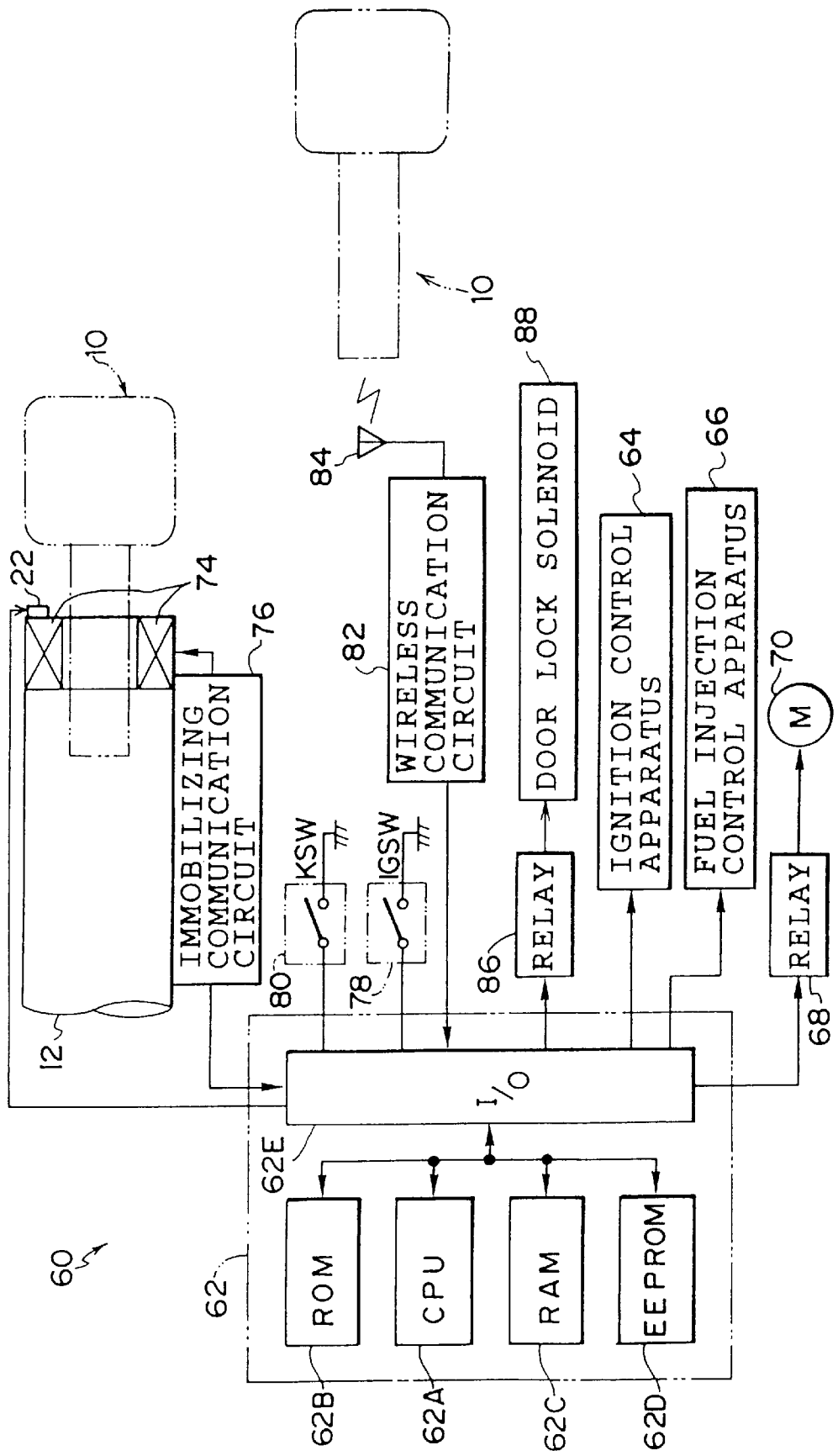
FIG. 4 is a circuit diagram of an electric circuit of a vehicle lock control apparatus.

Next, a structure of a vehicle lock control apparatus 60 disposed in the vehicle will be described with reference to FIG. 4. The vehicle lock control apparatus 60 is provided with an electronic control unit (ECU) 62. The ECU 62 is provided with a CPU 62A, a ROM 62B, a RAM 62C, an EEPROM 62D and an input/output port 62E, which are connected to each other through busses. A wireless code and a transponder code which are particular to the vehicle for which they are being used are stored in advance in the EEPROM 62D (or in the ROM 62B). The ECU 62 functions as an engine control ECU for the vehicle. An ignition control apparatus 64, which controls ignition of the engine, and a fuel injection control apparatus, which controls the fuel injection in the engine, are connected to the input/output port 62E. A starter motor 70 is connected to the input/output port 62E through a relay 68.

Further, in a key cylinder 12 of the vehicle, as mentioned above, the antenna coil 74 is disposed at the end portion at which the key insertion opening 24 is disposed. The antenna coil 74 is connected to an immobilizing communication circuit 76 disposed near the key cylinder 12, and the immobilizing circuit 76 is connected to the input/output port 62E of the ECU 62. Further, the LED 22 provided at the side end portion of the key insertion opening 24 of the key cylinder 12 is also connected to the input/output port 62E of the ECU 62.

As is well known, various types of switches, such as accessory switches for turning on and off the power source of accessory equipment, an ignition switch for turning on and off the power source of the spark plug or the like, a starter switch for turning on and off the power source of the starter motor, and the like, are mounted to the key cylinder 12. In these switches, a contact point is switched in correspondence to the position of the ignition key 10 along the rotating direction when the ignition key 10 is rotated after being inserted into the insertion opening of the key cylinder 12. Each of the various types of switches mentioned above is connected to the input/output port 62E of the ECU 62. (In FIG. 4, only an ignition switch (IGSW) 78 is illustrated.)

Further, a key switch (KSW) 80, which is turned on when the ignition key 10 is inserted into the insertion opening of the key cylinder 12, is also mounted to the key cylinder 12 in accordance with the present embodiment. The key switch 80 is also connected to the input/output port 62E of the ECU 62.

A wireless antenna 84 is connected to the input/output port 62E of the ECU 62 through a wireless communication circuit 82. For example, a rear window defogger can be utilized as the wireless antenna 84. Further, a door lock solenoid 88 is connected to the input/output port 62E of the ECU 62 through a relay 86. Although not shown in the drawings, a number of door lock solenoids 88 equal to the number of doors of the vehicle is provided. A plunger of each of the door lock solenoids 88 is connected to a door lock mechanism for any one of the doors of the vehicle through a link (not shown).

Next, operation of the present first embodiment will be described below.

Figure 5:
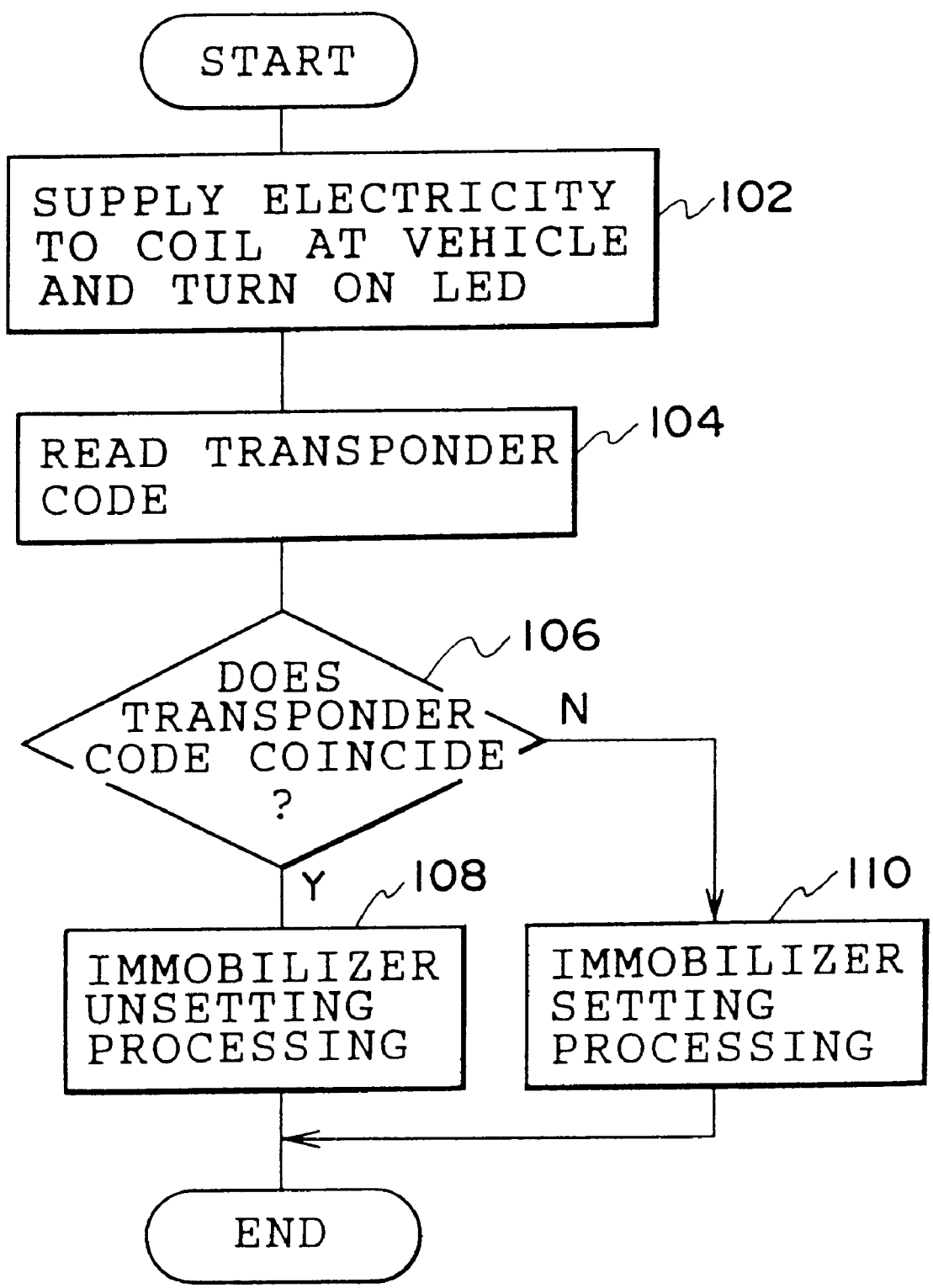
FIG. 5 is a flow chart which shows a control routine of the vehicle lock control apparatus.

FIG. 5 shows a control routine which the ECU 62 in the vehicle lock control apparatus 60 executes at a time when the key switch 80 is turned on. In step 102 in FIG. 5, the immobilizing communication circuit 76 is instructed to apply alternating current voltage to the antenna coil 74, and the immobilizing communication circuit 76 applies an alternating current voltage having a predetermined frequency to the antenna coil 74. Further, the LED 22 is turned on.

When the alternating current voltage is applied to the antenna coil 74 at the vehicle, the antenna coil 74 and the antenna coil 46 which is at the ignition key 10 are magnetically connected. Accordingly, the alternating current voltage is induced (received) in the antenna coil 46. The alternating current voltage induced in the antenna coil 46 is rectified and smoothed in the power source circuit 45 so as to be converted into a constant voltage, and is applied to the control circuit 42. Therefore, the control circuit 42 reads the transponder code stored in the memory section 44, adds a predetermined start code expressing a code start and a finish code expressing a code end to the front and back of the read transponder code, so as to generate a code string to be transmitted to the vehicle. Then, the value of each bit in the generated code string is referred to at a constant period successively from the leading bit, and the contact point of the switch 40 is switched such that the first load 36 or the second load 38 is connected to the antenna coil 46 in accordance with the value of each bit (0 or 1).

Accordingly, the resonance frequency mentioned above changes at all times in accordance with the values of the respective bits in the code string, and the amplitude of the alternating current voltage induced in the antenna coil 46 changes (is modulated) in accordance with the values of the respective bits in the code string, whereby the code string (the second signal) including the transponder code is transmitted to the vehicle.

In next step 104, the immobilizing communication circuit 76 is made to start reading at a predetermined period the code string transmitted from the vehicle. In step 106, it is judged whether the transponder code stored in the EEPROM 62D coincides with the transponder code within the code string transmitted from the vehicle.

In the case that the transponder codes coincide with each other, it is judged that an appropriate ignition key is inserted into the key cylinder, and then in step 108, immobilizer unsetting processing is executed. In the case that the transponder codes do not coincide with each other, it is judged that an appropriate ignition key is not inserted into the key cylinder, and then in step 110, an immobilizer setting processing is executed.

Figure 6:
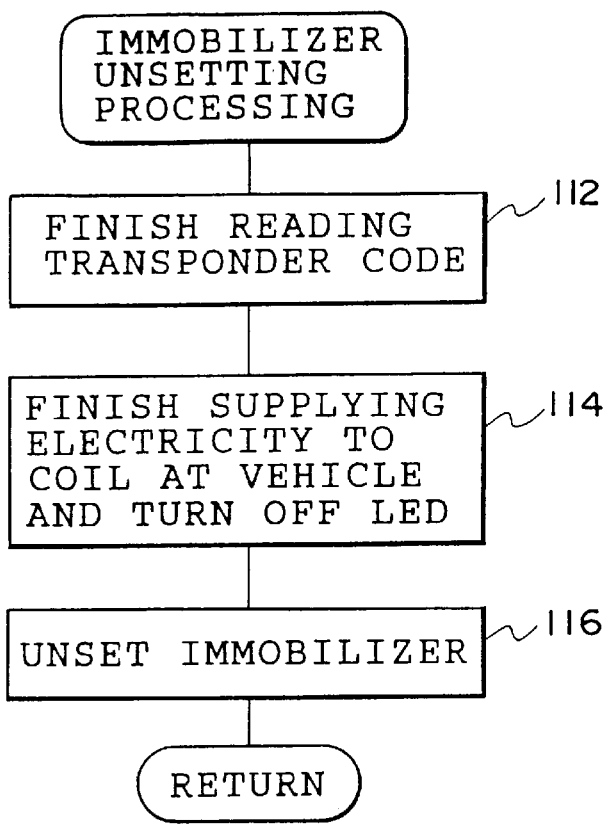
FIG. 6 is a flow chart which shows a sub-routine of step 108 in FIG. 5.

In the immobilizer unsetting processing (step 108), as illustrated in FIG. 6, in step 112, reading of the transponder code is completed. In step 114, the supplying of electricity to the coil at the vehicle (the antenna coil 74) is completed, and the LED 22 is turned off. Further, in order to allow starting of the engine, in step 116, the immobilizer is unset. Accordingly, when the ignition key 10 is rotated and the ignition switch 78 is turned on, electric power is supplied to the ignition control apparatus 64 and the fuel injection control apparatus 66. When the ignition key 10 is further rotated so that the starter switch is turned on, the starter motor 70 is driven through the relay 68.

Figure 7:
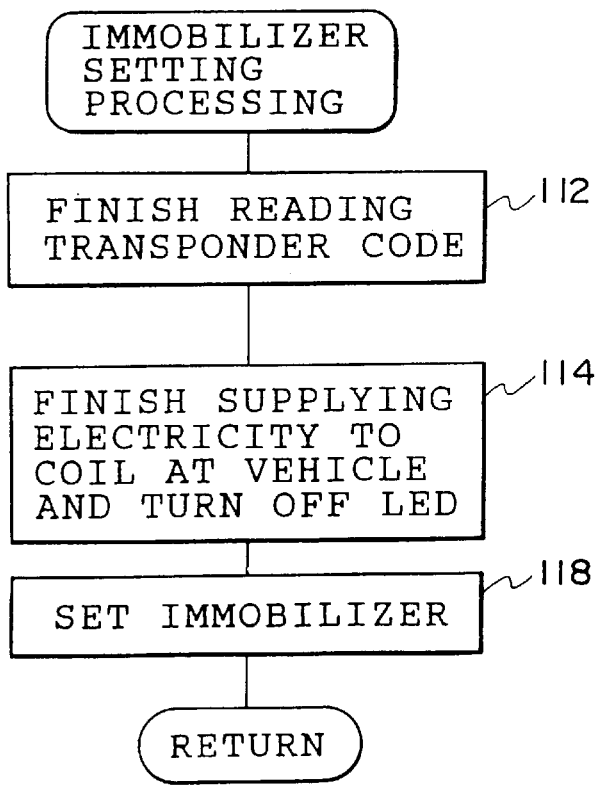
FIG. 7 is a flow chart which shows a sub-routine of step 110 in FIG. 5.

In the immobilizer setting processing (step 110), as shown in FIG. 7, after steps 112 and 114 have been executed, in step 118, the immobilizer is set in order to prohibit starting of the engine. Accordingly, even if the ignition key is rotated and the ignition switch 78 is turned on, no electric power is supplied to the ignition control apparatus 64 and the fuel injection control apparatus 66, and the ignition control apparatus 64 and the fuel injection control apparatus 66 are not operated. Therefore, the sparkplug is not ignited, and fuel is not injected from the fuel injection valve. Further, even if the ignition key is rotated and the starter switch is turned on, the starter motor 70 is not driven. Accordingly, since the vehicle engine cannot be started if an appropriate ignition key 10 is not used, theft of the vehicle can be prevented.

Figure 8:
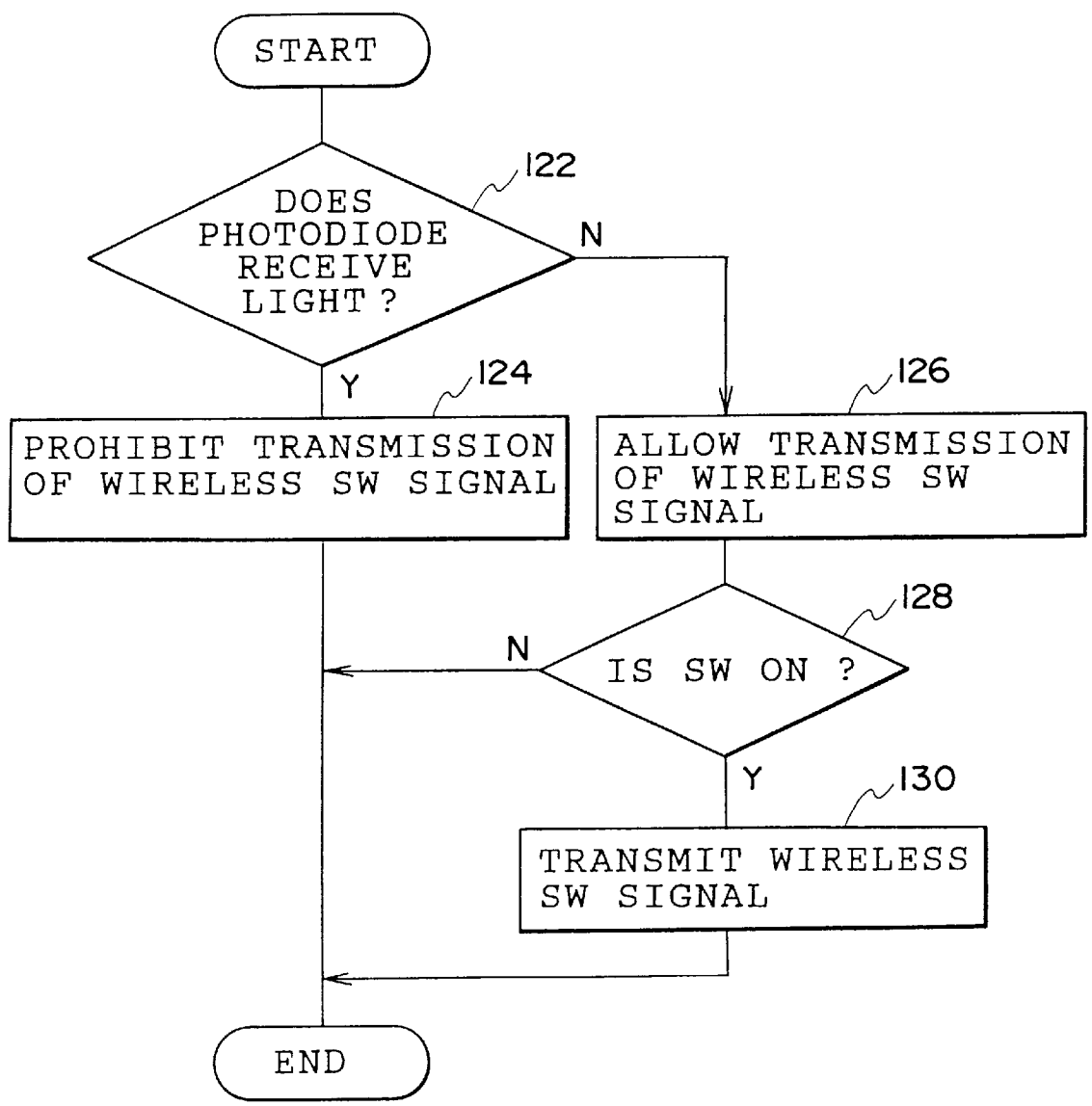
FIG. 8 is a flow chart which shows a control routine which the key apparatus for a vehicle in accordance with the first embodiment performs.

A control routine which the transmitting circuit 28 of the ignition key 10 executes each time a predetermined period of time passes is shown in FIG. 8. In step 122, it is judged whether the photodiode 32 is receiving light.

Here, as mentioned above (refer to FIG. 1A), when the ignition key 10 is inserted into the key cylinder 12, the LED 22 is turned on (refer to step 102). When the LED 22 is turned on, the light emitted by the LED 22 (corresponding to the third signal) reaches the photodiode 32 through the transparent window 26, and is received. Accordingly, the signal is output from the photodiode 32, and a light receiving signal is input through the amplification/light distinguishing circuit 52.

In this case, when the wireless SW signal is transmitted at a time when the light receiving signal is input, that is, at a time when transponder communication is carried out, communication of the transponder code is prevented by the transmitted wireless SW signal.

In a step 124, transmission of the wireless SW signal is prohibited by the operating signal not being outputted to the RF/driver circuit.

However, in the case that the photodiode 32 does not receive the light, since there is no fear that communication of the transponder code is prevented, in step 126, transmission of the wireless SW signal is allowed.

In the next step 128, it is judged whether the switch is on. In the case that the switch is on, in step 130, an instruction is given to the RF/driver circuit 90 to transmit the wireless signal corresponding to the first signal (the wireless signal for wireless door lock and unlock or for opening the trunk compartment, the glove compartment, or the like) in accordance with the operated switch 16 or 18.

In this way, when the ignition key is inserted in the key cylinder, the LED is lit, the photodiode provided at the ignition key receives the light, and transmission of the wireless SW signal is prohibited. Therefore, at this time, even if the switch of the ignition key is erroneously operated, the wireless SW signal is not transmitted. Therefore, prevention of communication of the transponder code can itself be prevented.

Next, a second embodiment in accordance with the present invention will be described.

In recent years, there has been proposed, for an electromagnetic wireless door lock system, that a wireless code be rolled (incremented) each time a transmission occurs, in order to improve security. In such a system, even if the switch provided at the ignition key is erroneously operated, the wireless SW signal is transmitted and the wireless code stored in the ignition key is incremented. In this case, the wireless code stored in the vehicle is not incremented in a case in which the vehicle does not receive the wireless SW signal. Accordingly, the values of the wireless codes respectively stored in the ignition key and in the vehicle side greatly differ, and the codes do not coincide, so that the door lock cannot be operated. The present embodiment has taken the above into consideration, and solves this disadvantage.

Since the structure of the present second embodiment is the same as the structure of the first embodiment, description will be omitted.

Next, operation of the present embodiment will be described. Because certain portions of the operation of the present embodiment are the same as those of the previously-described first embodiment, only the different portions will be explained, and description of the same portions of the operation will be omitted.

Figure 9:
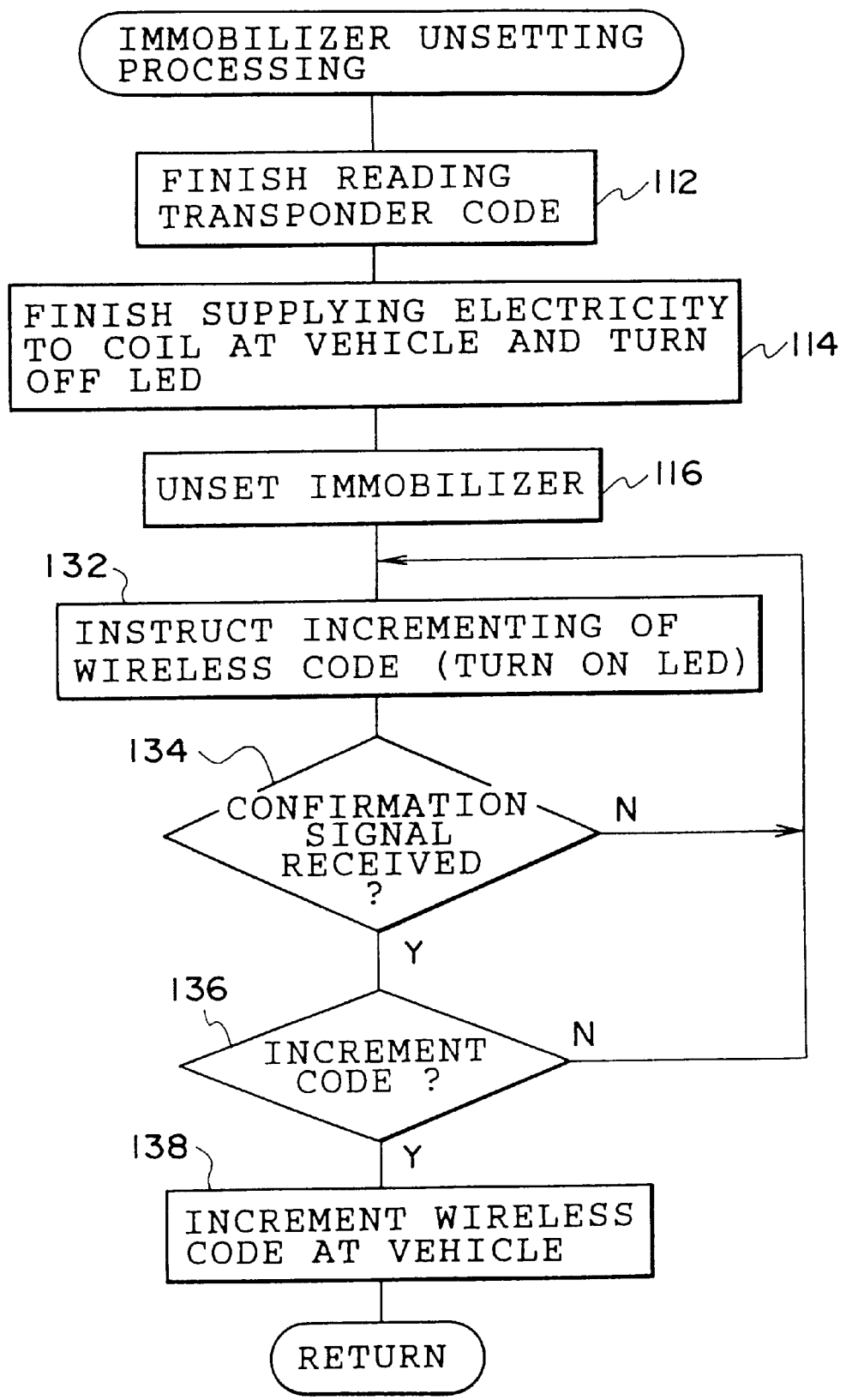
FIG. 9 is a flow chart which shows a sub-routine of step 108 in accordance with a second embodiment.

In the vehicle lock control apparatus 60 in accordance with the present second embodiment, only the immobilizer unsetting processing (step 108) is different. Namely, as shown in FIG. 9, after executing steps 112 to 116, in step 132, the ignition key 10 is instructed, by an LED flashing code (a fourth signal) generated by flashing of the LED 32, to increment the wireless code.

In next step 134, it is judged whether a confirmation signal from the ignition key 10 has been received. If a confirmation signal has been received, in step 136, it is judged whether the confirmation signal includes an increment code. If the confirmation signal includes an increment code, in step 138, the wireless code at the vehicle (stored in the EEPROM 62D) is incremented.

Figure 10:
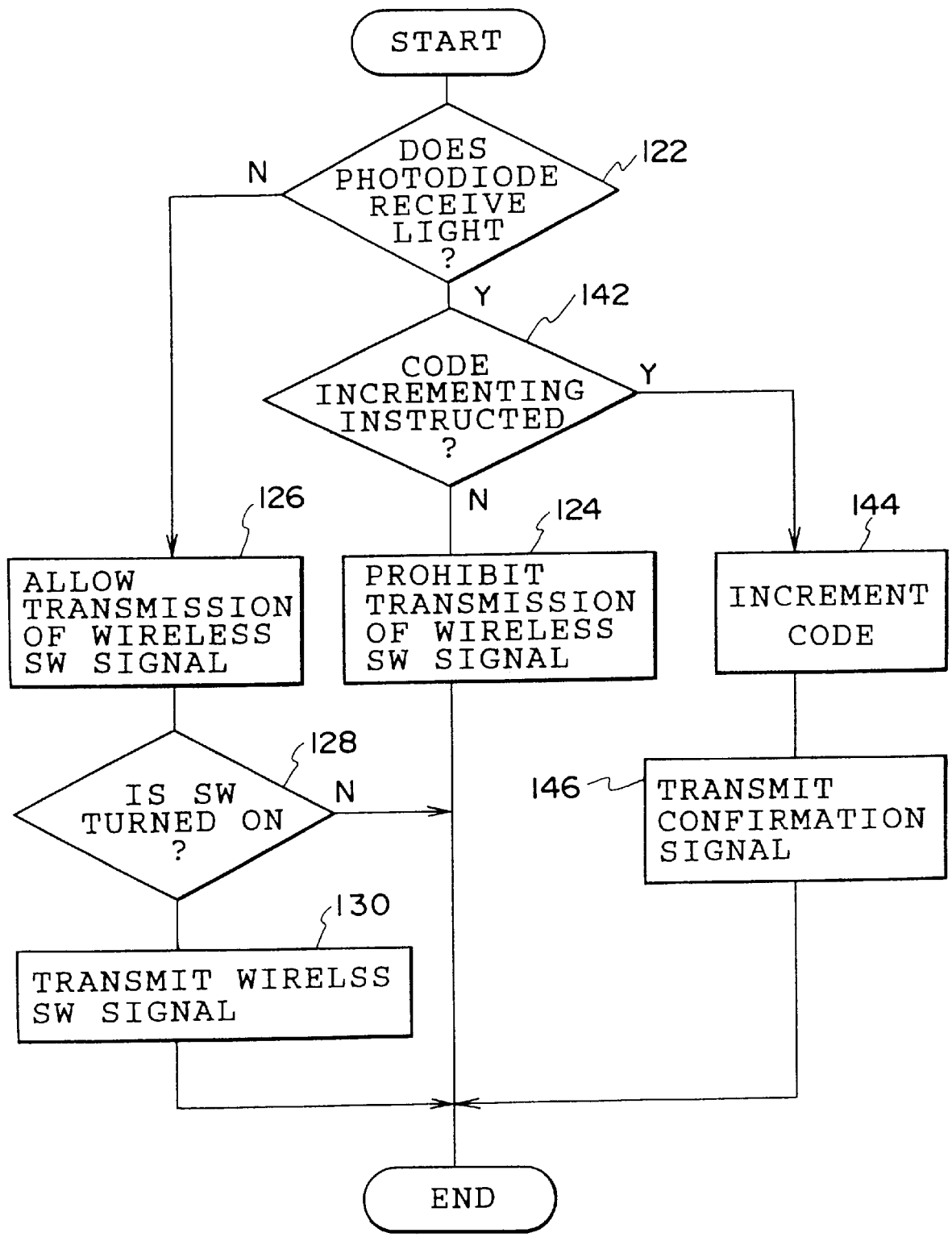
FIG. 10 is a flow chart which shows a control routine which a key apparatus for a vehicle in accordance with the second embodiment performs.
Figure 11:
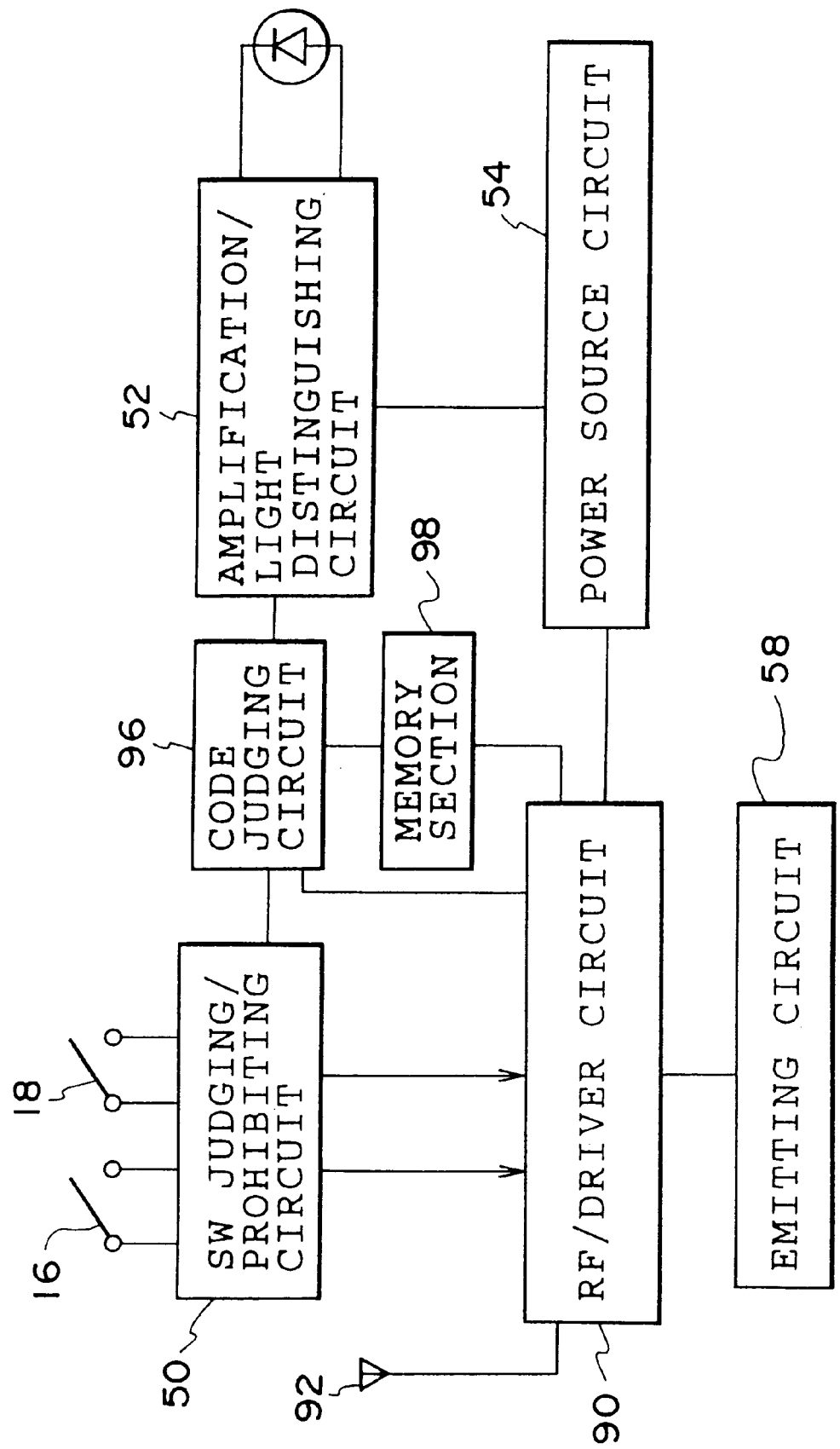
FIG. 11 is a circuit diagram of a transmitting circuit provided in a vehicle control apparatus in accordance with a third embodiment.

At the ignition key, as shown in FIG. 10, if the answer to the determination in step 122 is affirmative, in step 142, it is judged whether the LED flashing code is giving a code increment instruction. If the LED flashing code is giving a code increment instruction, in step 144, the wireless code stored in the memory section 56 is incremented, and in step 146, an instruction to transmit the confirmation signal is given.

As described above, since incrementing of the wireless code stored in the ignition key is instructed by the flashing code of the LED in the vehicle, the incrementing of the wireless code in the vehicle and the incrementing of the wireless code in the key are synchronized, so that incrementing of only the wireless code in the key due to erroneous operation of the switch can be prevented.

Further, since the wireless codes in the vehicle and in the key are incremented after the code of the transponder has been verified, security can be further improved.

Next, a third embodiment of the present invention will be described.

The present third embodiment prevents the problem of the engine not starting due to trouble with the transponder 30.

The structure of the present third embodiment is substantially the same as that of the above-described first embodiment. However, there is a difference with respect to the point that, in the present third embodiment, a code judging circuit 96 connected to the RF/driver circuit 90 is connected between the SW judging/prohibiting circuit 50 and the amplification/light distinguishing circuit 52, and a memory section 98 is further connected between the code judging circuit 96 and the RF/driver circuit 90. The transponder code and the wireless code are stored in the memory section 98.

Next, operation of the present third embodiment will be described. Because portions of the operation of the present third embodiment are the same as those of the previously-described first embodiment, the same portions are denoted by the same reference numerals and description thereof is omitted, and only the different portions will be described.

Figure 12:
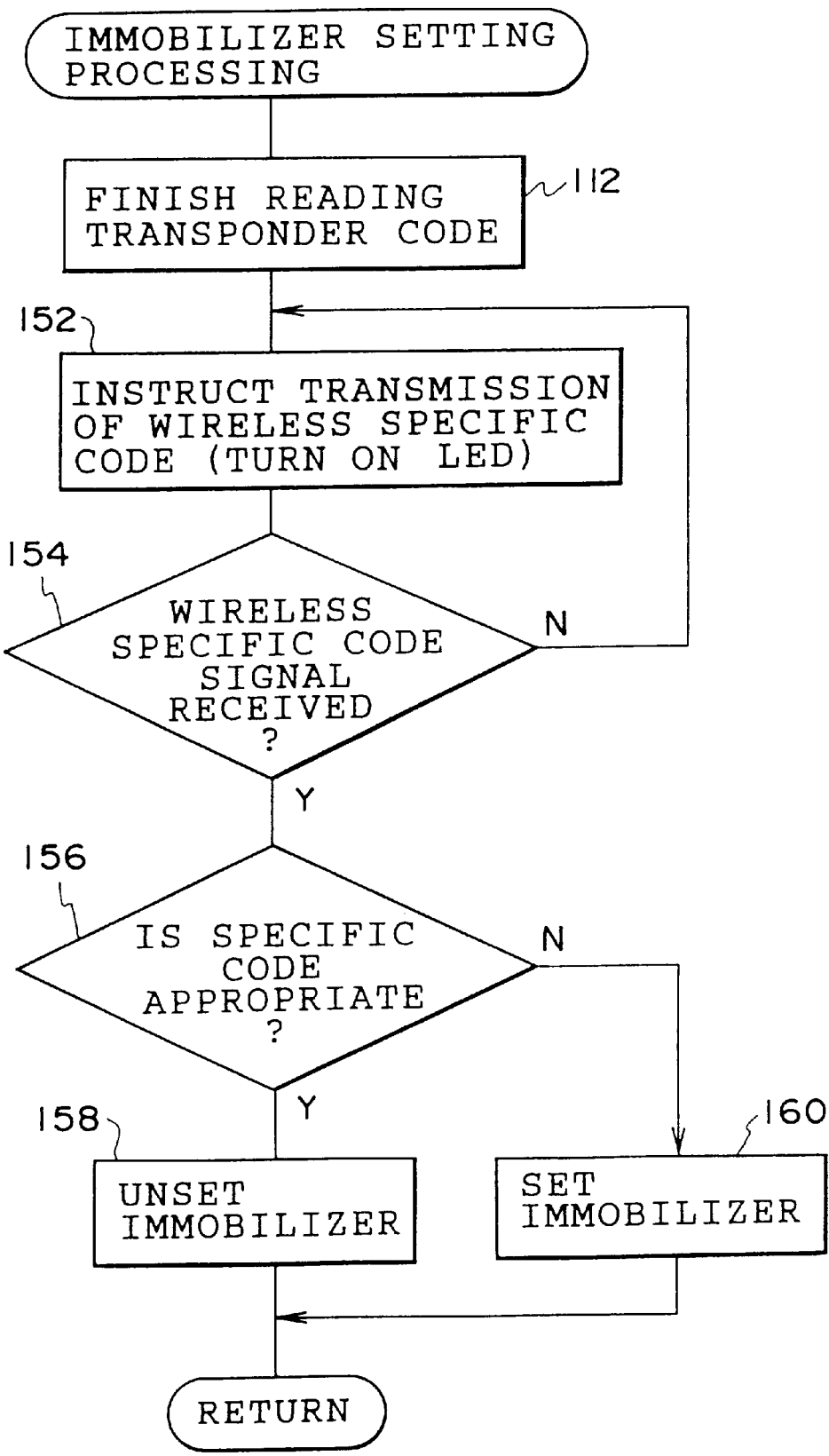
FIG. 12 is a flow chart which shows a sub-routine of a step 110 in accordance with the third embodiment.

In the immobilizer setting processing (step 110) of the present third embodiment, as shown in FIG. 12, after step 112, in step 152, the LED 22 flashes so as to instruct, by an LED flashing code (a fifth signal), the transmission of the wireless specific code. In step 154, it is judged whether the wireless specific code signal has been received. If the wireless specific code signal has been received, in step 156, it is judged whether the specific code (the wireless code) is appropriate. In the case that the specific code is appropriate, in step 158, immobilizer unsetting is carried out. In the case that the specific code is not appropriate, in step 160, immobilizer setting is carried out.

Figure 13:
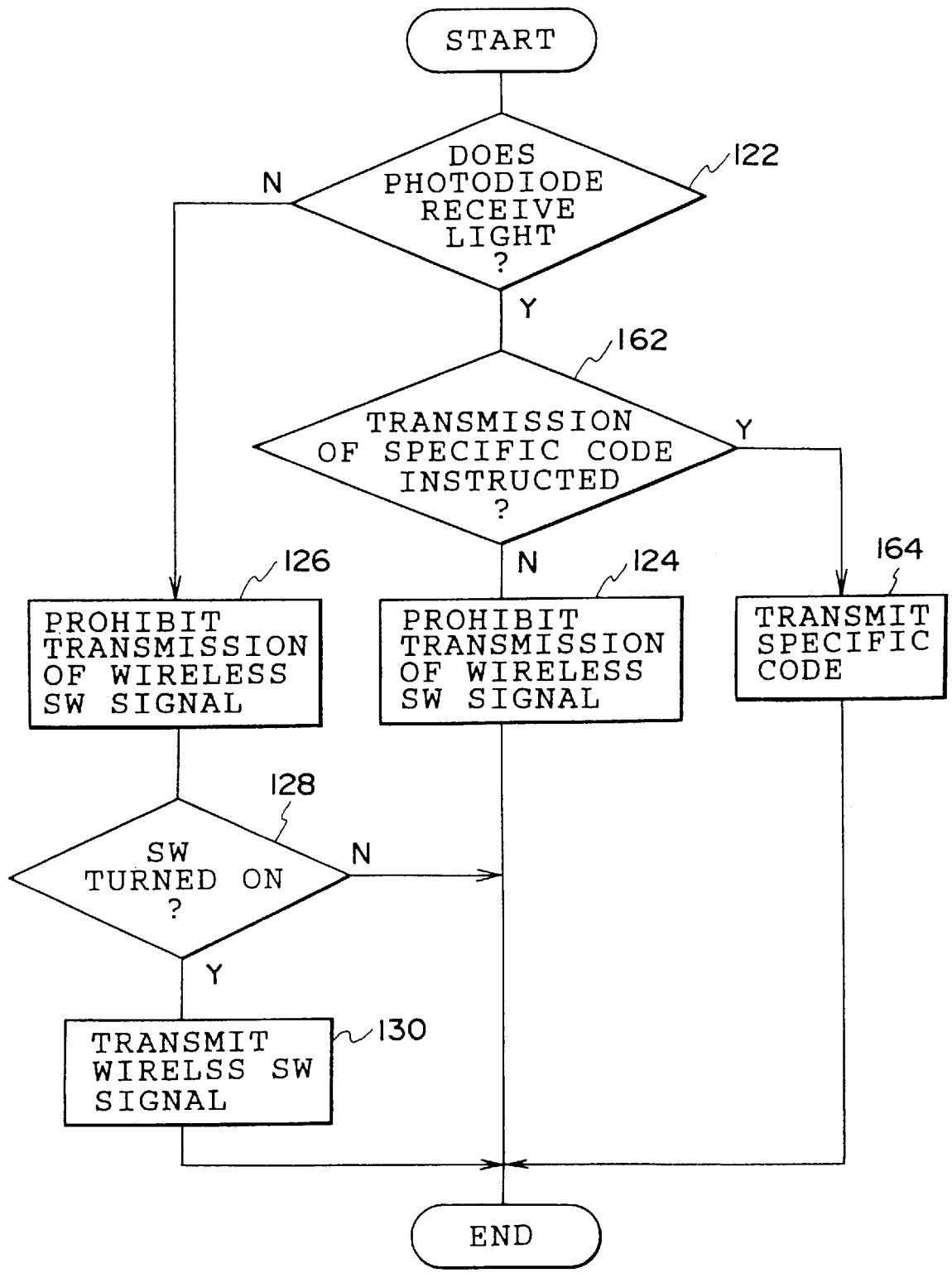
FIG. 13 is a flow chart which shows a control routine which a key apparatus for a vehicle in accordance with the third embodiment performs.

In the transmitting circuit 28, as shown in FIG. 13, if the determination in step 122 is affirmative, in step 162, it is judged whether the LED flashing code is instructing transmission of the specific code. If the LED flashing code is instructing transmission of the specific code, in step 164, an instruction is given to transmit the specific code (the wireless code (which is stored in the memory section 98)). In this case, the structure may be formed such that only the transponder code is stored in the memory section 98, the memory section 44 of the transponder 30 is connected to the RF/driver circuit 90, and the RF/driver circuit 90 reads the wireless code from the memory section 44 of the transponder 30.

In this way, in the immobilizer setting processing, the ignition key 10 is instructed to transmit the wireless SW signal, and if the wireless code transmitted from the ignition key 10 coincides with the wireless code stored in advance in the vehicle, immobilizer unsetting is carried out. Therefore, a situation in which trouble arises in that the transponder code cannot be transmitted to the transponder and the engine cannot be started even if the appropriate ignition key is inserted in the ignition cylinder can be prevented.

It may happen that the wireless SW signal communication sensitivity at the vehicle in the wireless door lock system markedly decreases in specific geographical regions. This is because there is much noise near the frequency of the main emitted radio wave used for transmitting the wireless SW signal.

At least one predetermined geographical region having a bad radio wave environment is stored in the EEPROM 62D of the vehicle lock control apparatus 60, and an antenna for receiving a global positioning signal (a GPS signal) is provided. Then, from the GPS signal received by the antenna, it is judged whether the vehicle is positioned in a stored geographical region. In the case that the vehicle is judged to be positioned in a stored geographical region, changing of the frequency is instructed by the LED flashing signal mentioned above. Accordingly, the RF/driver circuit 90 (frequency changing means) changes the frequency of the main emitted radio wave used for transmitting the wireless SW signal. Therefore, prevention of communication of the wireless SW signal due to noise is itself prevented.

In accordance with the above-described embodiments, the aforementioned instructions are given by the LED flashing code. However, the present invention is not limited to the same, and the aforementioned instructions may be given by an instruction signal by means of radio waves.

Further, in the key apparatus for a vehicle in accordance with the above-described embodiments, the transmitting circuit and the transponder are provided separately. However, the present invention is not limited to the same, and the transmitting circuit and the transponder may be structured as an integral circuit.

What is claimed is:

1. A key apparatus for a vehicle comprising:
   a tranmitting circuit which is provided with an instructing switch for instructing transmission of a first signal, and which transmits the first signal by radio waves in accordance with the instruction by the instructing switch;
   an electric power receiving/signal transmitting circuit for receiving electric power from an electric power transmitting circuit provided in the vehicle and for transmitting a second signal in a case in which the electric power receiving/signal transmitting circuit receives the electric power; and
   a prohibiting circuit for prohibiting transmission of the first signal in a case in which the second signal is transmitting, including:
   a receiver for receiving a third signal transmitted from the vehicle and expressing prohibition of transmission of the first signal, and
   a signal transmission prohibiting circuit for prohibiting transmission of the first signal while the third signal is being received by the receiver.

2. A key apparatus for a vehicle according to claim 1, wherein the third signal is provided by light communication.

3. A key apparatus for a vehicle according to claim 1, wherein the first signal is a signal expressing a number, and after the third signal is transmitted from the vehicle, a fourth signal for instructing a change of the number to be transmitted as the first signal is further transmitted, and the receiver is structured so as to be able to receive the fourth signal, and in a case in which the fourth signal is received by the receiver, the electric power transmitting circuit changes the number by a predetermined amount and transmits as the first signal a signal expressing the changed number.

4. A key apparatus for a vehicle according to claim 1, wherein after the third signal has been transmitted from the vehicle, in a case in which the second signal is not received, a fifth signal instructing transmission of a specific signal is transmitted, and the receiver is structured so as to be able to receive the fifth signal, and the electric power receiving/signal transmitting circuit is structured so as to be able to transmit the specific signal, and in a case in which the fifth signal is received by the receiver, the electric power receiving/signal transmitting circuit further transmits the specific signal.

5. A key apparatus for a vehicle according to claim 4, wherein the specific signal is the first signal.

6. A key apparatus for a vehicle according to claim 1, wherein the vehicle stores at least one predetermined geographical region having a bad environment for radio waves, detects a position of the vehicle, and judges whether the detected position of the vehicle is a position in a stored geographical region, and in a case in which the position of the vehicle is judged to be a position in a stored geographical region, the vehicle further transmits a sixth signal instructing a change of a frequency for transmitting the first signal, and the receiver is structured so as to be able to receive the sixth signal, and in a case in which the sixth signal is received by the receiver, the transmitting circuit changes the frequency and transmits the first signal at the changed frequency.

7. A key apparatus for a vehicle according to claim 1, wherein the first signal is an instructing signal expressing a control instruction for a door lock of the vehicle, and the second signal is an identification signal used for permitting starting of a vehicle engine.

8. A method of controlling starting of the vehicle engine for controlling starting of the vehicle engine by communication between the key apparatus for the vehicle according to claim 7 and the vehicle which is equipped with the electric power transmitting circuit for transmitting electric power to the key apparatus for the vehicle and for receiving the second signal, a receiver which receives the first signal, a door lock controller which controls door locking and door unlocking on the basis of a signal from the receiver, a key cylinder in and from which the key apparatus for the vehicle can be inserted and withdrawn, and a vehicle engine control device for controlling the vehicle engine, the method comprising the steps of:

operating the electric power transmitting circuit of the vehicle in a case in which the key apparatus for the vehicle is inserted in the key cylinder;

the key apparatus for the vehicle transmitting the second signal in a case in which electric power is received from the electric power transmitting circuit; and the vehicle engine control device controlling starting of the vehicle engine at the vehicle on the basis of the second signal received by the electric power transmitting circuit.

9. A key system for the vehicle comprising:

the key apparatus for the vehicle according to claim 7; and provided in the vehicle, the electric power transmitting circuit for transmitting electric power to the key apparatus for the vehicle and for receiving the second signal, a receiver which receives the first signal, a door lock controller which controls door locking and door unlocking on the basis of a signal from the receiver, a key cylinder in and from which the key apparatus for the vehicle can be inserted and withdrawn, and a vehicle engine control device for controlling the vehicle engine, wherein the key system further comprises an operating circuit for operating the electric power transmitting circuit of the vehicle in a case in which the key apparatus for a vehicle is inserted in the key cylinder, and the vehicle engine control device controls starting of the vehicle engine on the basis of the second signal.

10. A key apparatus for a vehicle comprising:

transmitting means provided with an instructing means for instructing transmission of a first signal, and transmitting the first signal by radio waves in accordance with the instruction by the instructing means;

electric power receiving/signal transmitting means for receiving electric power from an electric power transmitting means provided in the vehicle, and transmitting a second signal in a case in which the electric power receiving/signal transmitting means receives the electric power; and prohibiting means for prohibiting transmission of the first signal in a case in which the second signal is transmitted, including:

receiving means for receiving a third signal transmitted from the vehicle and expressing prohibition of transmission of the first signal, and signal transmission prohibiting means for prohibiting transmission of the first signal while the third signal is being received by the receiving means.

11. A key apparatus for a vehicle according to claim 10, wherein the third signal is provided by light communication.

12. A key apparatus for a vehicle according to claim 10, wherein the first signal is a signal expressing a number, and after the third signal is transmitted from the vehicle, a fourth signal for instructing a change of the number to be transmitted as the first signal is further transmitted, and the receiving means is structured so as to be able to receive the fourth signal, and the key apparatus further comprises changing means for changing the number by a predetermined amount in a case in which the fourth signal is received by the receiving means.

13. A key apparatus for a vehicle according to claim 10, wherein after the third signal has been transmitted from the vehicle, in a case in which the second signal is not received, a fifth signal instructing transmission of a specific signal is transmitted, and the receiving means is structured so as to be able to receive the fifth signal, and the electric power receiving/signal transmitting means is structured so as to be able to transmit the specific signal, and in a case in which the fifth signal is received by the receiving means, the electric power receiving/signal transmitting means further transmits the specific signal.

14. A key apparatus for a vehicle according to claim 13, wherein the specific signal is the first signal.

15. A key apparatus for a vehicle according to claim 10, wherein the vehicle stores at least one predetermined geographical region having a bad environment for radio waves, detects a position of the vehicle, and judges whether the detected position of the vehicle is a position in a stored geographical region, and in a case in which the position of the vehicle is judged to be a position in a stored geographical region, the vehicle further transmits a sixth signal instructing a change of a frequency for transmitting the first signal, and the receiving means is structured so as to be able to receive the sixth signal, and the key apparatus further comprises frequency changing means for changing the frequency in a case in which the sixth signal is received by the receiving means.

16. A key apparatus for a vehicle according to claim 10, wherein the first signal is an instructing signal expressing a control instruction for door locking of the vehicle, and the second signal is an identification signal used for permitting starting of a vehicle engine.

17. A method of controlling starting of the vehicle engine for controlling starting of the vehicle engine by communication between the key apparatus for the vehicle according to claim 16 and the vehicle which is equipped with the electric power transmitting means for transmitting electric power to the key apparatus for the vehicle and for receiving the second signal, receiving means for receiving the first signal, door lock means for controlling door locking and door unlocking on the basis of a signal from the receiving means, a key cylinder in and from which the key apparatus for the vehicle can be inserted and withdrawn, and vehicle engine control means for controlling the vehicle engine, the method comprising the steps of:

Operating the electric power transmitting means of the vehicle in a case in which the key apparatus for the vehicle is inserted in the key cylinder;

the key apparatus for the vehicle transmitting the second signal in a case in which electric power is received from the electric power transmitting means; and the vehicle engine control means controlling starting of the vehicle engine at the vehicle on the basis of the second signal received by the electric power transmitting means.

18. A key system for the vehicle comprising:

the key apparatus for the vehicle according to claim 16; and provided in the vehicle, the electric power transmitting means for transmitting electric power to the key apparatus for the vehicle and for receiving the second signal, receiving means for receiving the first signal, door lock means for controlling door locking and door unlocking on the basis of a signal from the receiving means, a key cylinger in and from which the key apparatus for the vehicle can be inserted and withdrawn, and vehicle engine control means for controlling the vehicle engine, wherein the key system further comprises operating means for operating the electric power transmitting means of the vehicle in a case in which the key apparatus for a vehicle is inserted in the key cylinder, and the vehicle engine control means controls starting of the vehicle engine on the basis of the second signal.

* * * * *

UNITED STATES PATENT AND TRADEMARK OFFICE
CERTIFICATE OF CORRECTION

PATENT NO.: 6,093,980

DATED: July 25, 2000

INVENTOR(S): Yamamoto et al.

It is certified that an error appears in the above-identified patent and that said Letters Patent is hereby corrected as shown below:

Claim 17, col. 6, line 56 - change "Operating" to --operating--.

Claim 18, col. 17, line 12 - change "cylinger" to --cylinder--.

Signed and Sealed this

Seventeenth Day of April, 2001

Attest:

NICHOLAS P. GODICI

Attesting Officer     Acting Director of the United States Patent and Trademark Office